US 8,155,692 B1

(12) United States Patent
Roka

(10) Patent No.: US 8,155,692 B1
(45) Date of Patent: Apr. 10, 2012

(54) MOBILE COMMUNICATIONS DEVICE WITH ROTATING KEYBOARDS

(75) Inventor: Pujan K. Roka, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 366 days.

(21) Appl. No.: 12/475,646

(22) Filed: Jun. 1, 2009

(51) Int. Cl.
*H04M 1/00* (2006.01)

(52) U.S. Cl. .................... 455/550.1; 455/575.4

(58) Field of Classification Search ........... 455/550.1, 455/556.2, 575.1, 575.4, 575.8, 90.3; 379/433.01, 379/433.07, 433.12, 433.13
See application file for complete search history.

(56) References Cited

U.S. PATENT DOCUMENTS

| 596,622 | A | | 1/1898 | Rowe |
|---|---|---|---|---|
| D62,928 | S | | 12/1922 | Hyde |
| D284,660 | S | | 7/1986 | Montague et al. |
| D319,059 | S | * | 8/1991 | Divine .................... D14/168 |
| D357,256 | S | | 4/1995 | Jardine |
| D358,149 | S | | 5/1995 | Fellinger |
| 5,432,510 | A | | 7/1995 | Matthews |
| D368,987 | S | | 4/1996 | Boucheron |
| D371,793 | S | | 7/1996 | Patton |
| D427,172 | S | | 6/2000 | Bequir |
| D488,142 | S | * | 4/2004 | Wang et al. ............ D14/138 AB |
| D489,045 | S | | 4/2004 | Wang et al. |
| D489,343 | S | | 5/2004 | Wang et al. |
| D496,916 | S | | 10/2004 | Wang et al. |
| D496,917 | S | | 10/2004 | Brandis |
| D496,920 | S | | 10/2004 | Peng et al. |
| 6,850,226 | B2 | | 2/2005 | Finke-Anlauff |
| D526,973 | S | | 8/2006 | Gates et al. |
| 7,107,018 | B2 | | 9/2006 | Jellicoe |
| D566,095 | S | | 4/2008 | Davis |
| D568,304 | S | | 5/2008 | Park |
| D578,711 | S | | 10/2008 | Burrow et al. |
| 7,478,972 | B2 | * | 1/2009 | Takamori et al. .......... 403/409.1 |
| D597,514 | S | | 8/2009 | Gencarella et al. |
| D601,537 | S | | 10/2009 | Wang et al. |
| 7,877,123 | B2 | * | 1/2011 | Abdul-Gaffoor et al. . 455/575.4 |
| 2003/0078069 | A1 | * | 4/2003 | Lindeman .................... 455/550 |
| 2005/0070348 | A1 | | 3/2005 | Lee et al. |
| 2006/0199607 | A1 | | 9/2006 | Shi et al. |
| 2006/0211384 | A1 | | 9/2006 | Kayzar et al. |
| 2007/0161418 | A1 | * | 7/2007 | Chen et al. ................ 455/575.4 |
| 2008/0207272 | A1 | * | 8/2008 | Thornton et al. ............. 455/566 |

FOREIGN PATENT DOCUMENTS

WO DM058448 11/2001
WO DM/061922 11/2002

OTHER PUBLICATIONS

DVICE, The Intruder: cell phone or flying saucer?, 2 pp, Mar. 19, 2009, http://dvice.com/archives/2007/04/the_intruder_cell_phone_or_fly.php.
Notice of Allowance and Fee(s) Due, 6707/SPRI.147726, Title of Invention: Circular Mobile Phone, U.S. Appl. No. 29/337,880, filed May 1, 2009, First Named Inventor: Pujan K. Roka, Confirmation No. 3957, Date Mailed Jan. 22, 2010.

* cited by examiner

*Primary Examiner* — Ping Hsieh

(57) ABSTRACT

A mobile communication device is provided that includes at least two keyboards incorporated into a keyboard tray that both slides and rotates relative to the main body of the mobile communications device. When the keyboard tray is extended, the different keyboards may be accessed by rotating the keyboard. Both the main body of the mobile communications device and the keyboard tray may have a circular shape.

11 Claims, 7 Drawing Sheets

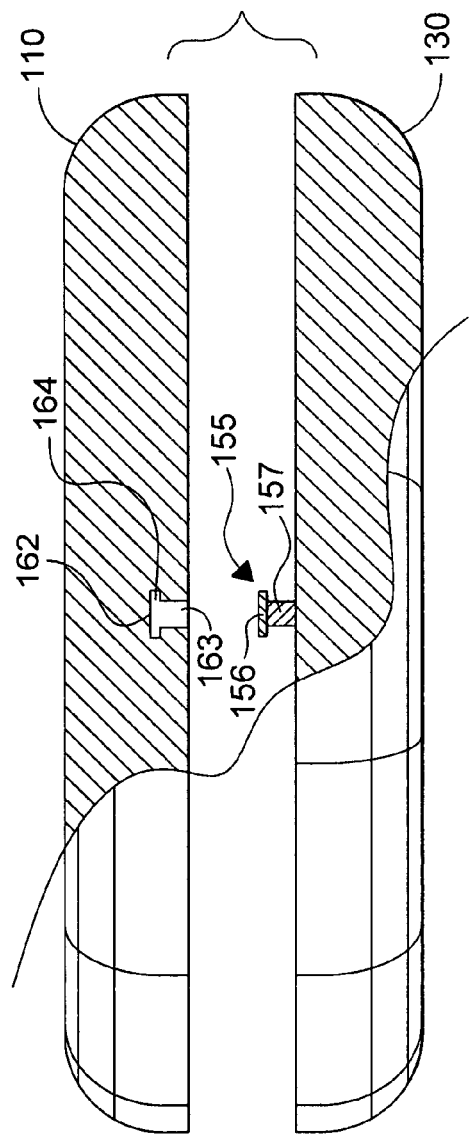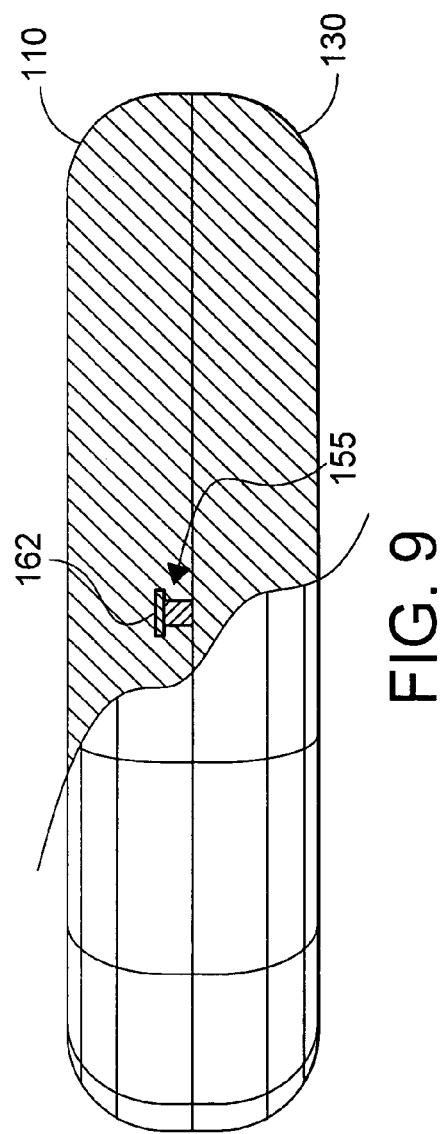

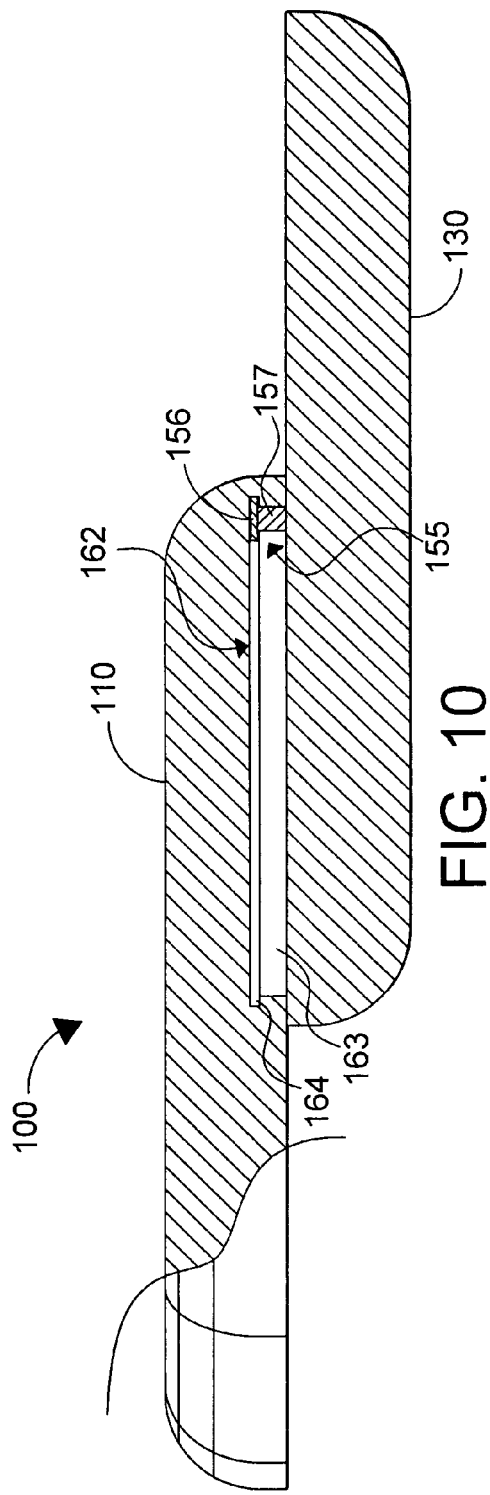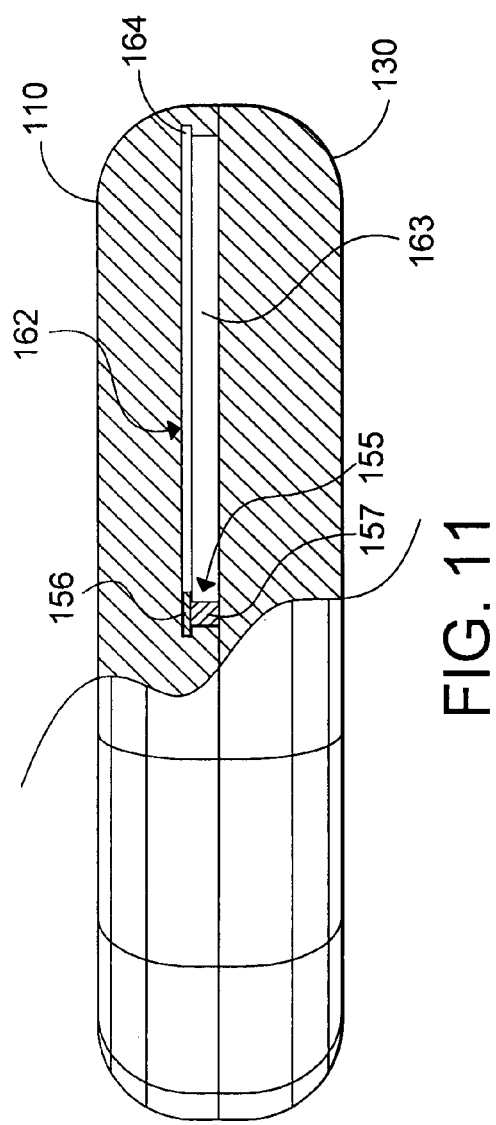

MOBILE COMMUNICATIONS DEVICE WITH ROTATING KEYBOARDS

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, a mobile communications device is provided. The mobile communications device includes a main body having a top body surface that is opposite a bottom body surface, the main body defining an elongated channel having an opening through the bottom body surface. The mobile communications device also includes a display screen incorporated into the top body surface and a keyboard tray physically connected to and electrically connected with the main body. The keyboard tray has a top tray surface that is opposite a bottom tray surface. The mobile communications device also includes a pin protruding from the top tray surface and engaged with the elongated channel in the bottom body surface, thereby connecting the keyboard tray to the main body such that the keyboard tray may slide from a first position at an end of the elongated channel near a center of the main body to a second position at an opposite end of the elongated channel near an edge of the main body. The pin also allows the keyboard tray to rotate relative to the main body. The mobile communication device includes a first keyboard incorporated into a first section of the top tray surface, wherein the first keyboard has a first orientation. The first keyboard includes a first plurality of keys. The mobile communications device includes a second keyboard incorporated into a second section of the top tray surface. The second keyboard has a second orientation that is different than the first orientation. The second keyboard includes a second plurality of keys some of which keys are different than keys in the first plurality of keys. The first section and the second section are on different sides of the pin.

In another illustrative embodiment, a circular-shaped mobile communications device having a main body that slides and rotates relative to a keyboard tray is provided. The circular-shaped mobile communications device includes a main body having a top body surface that is opposite a bottom body surface, the main body defining an elongated channel having an opening through the bottom body surface. The main body has a circular shape. The circular-shaped mobile communications device also includes a keyboard tray connected to the main body such that the keyboard tray may slide and rotate relative to the main body. The keyboard tray has a top tray surface that is opposite a bottom tray surface. The keyboard tray has a circular shape. The circular-shaped mobile communications device also includes a first keyboard incorporated into a first section of the top tray surface. The first keyboard is a QWERTY keyboard and has a first orientation and a second keyboard incorporated into a second section of the top tray surface. The second keyboard has a second orientation that is different than the first orientation. The second keyboard is a standard phone keypad.

In a further illustrative embodiment, a mobile communications device with a perimeter shaped as an oblate spheroid when the mobile communications device is in a closed position is provided. The mobile communications device includes a main body shaped as a semi oblate spheroid and a keyboard tray shaped as a semi oblate spheroid that is physically connected to the main body such that the keyboard tray may rotate at least 360 degrees relative to the main body. The mobile communications device is in a closed position when the main body is directly on top of the keyboard tray.

BRIEF DESCRIPTION OF THE SEVERAL VIEWS OF THE DRAWINGS

Illustrative embodiments of the present invention are described in detail below with reference to the included drawing figures, wherein:

FIG. 8 is a diagram showing an exploded section view of the main body and the keyboard tray from a top perspective, in accordance with an embodiment of the present invention;

FIG. 9 is a diagram showing a section view of the main body and the keyboard tray from a top perspective, in accordance with an embodiment of the present invention;

FIG. 10 is a diagram showing a section view of the main body and the keyboard tray in the open position from the side perspective; in accordance with an embodiment of the present invention;

FIG. 11 is a diagram showing a section view of the main body and the keyboard tray in the closed position from the side perspective; in accordance with an embodiment of the present invention;

DETAILED DESCRIPTION

Embodiments of the present invention are directed to a mobile communications device (e.g., PDA, mobile phone, smart phone) having a keyboard tray that slides out from the main body and rotates to reveal two or more input devices (e.g., keypads). None of the keypads on the keyboard tray are visible when the mobile-communication device is in the closed position with the keyboard tray directly under the main body. The mobile communications device is opened by sliding the keyboard tray out from under the main body. When open, at least one keypad is visible and accessible by a user. From the open position, the keyboard tray may be rotated relative to the main body to reveal additional keypads. The keyboard tray may include two or more keypads, including a standard phone keypad, a QWERTY keypad, or a modified QWERTY keypad. The mobile communications device may activate the exposed keypad and deactivate the one or more keypads that are covered or partially covered by the main body. In one embodiment, both the main body and the keyboard tray of the mobile communications device are generally circular in shape. Thus, when the main body and the keyboard tray are directly on top of one another, the mobile communications device may be in the shape of an ellipsoid, and more specifically an oblate spheroid.

Figure 1:
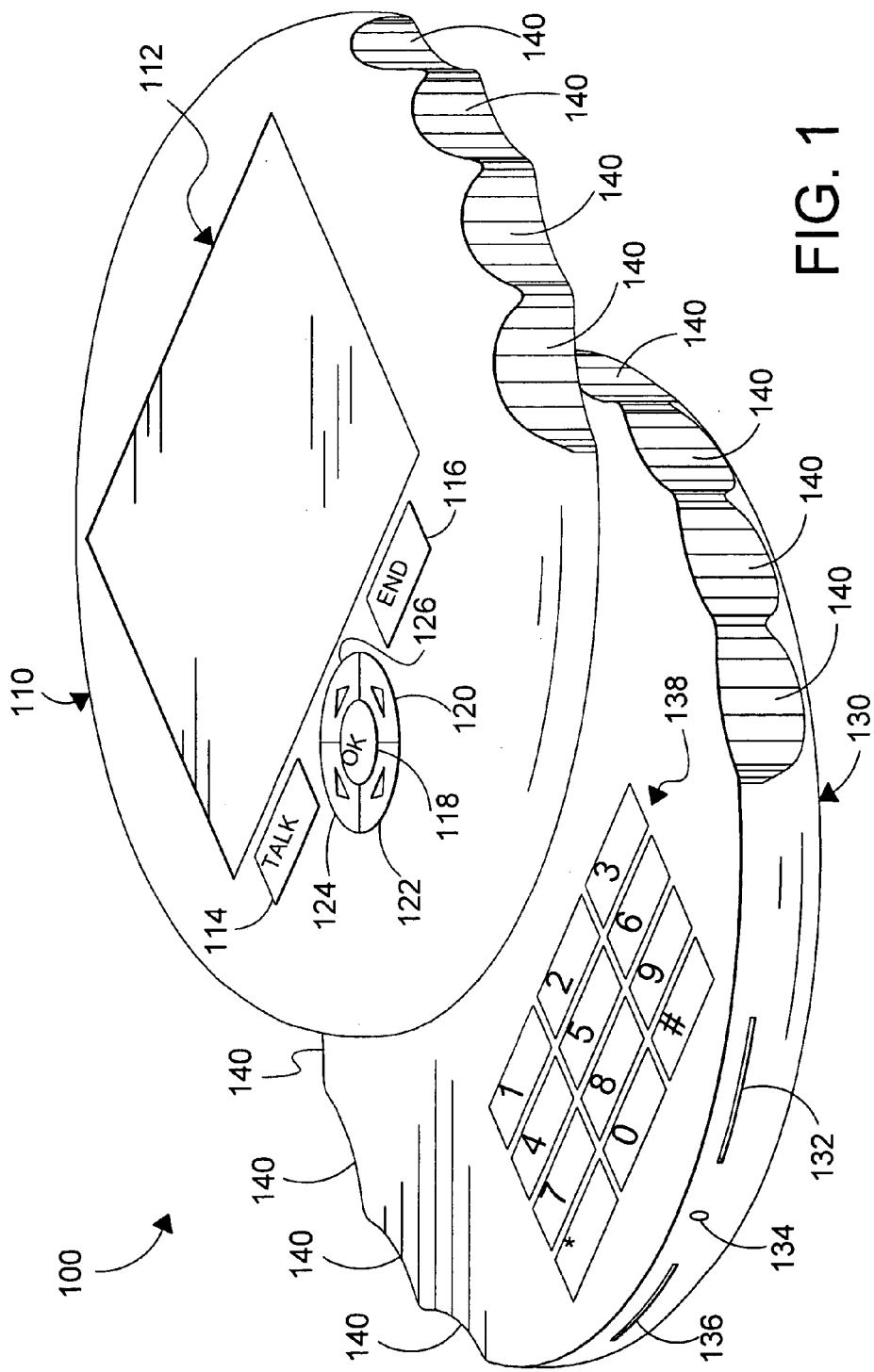
FIG. 1 is a diagram showing a circular mobile communications device, in accordance with an embodiment of the present invention.

Turning now to FIG. 1, a circular mobile communications device 100 is shown, in accordance with an embodiment of the present invention. The main body 110 (sometimes referred to as the top portion) includes a display screen 112, a talk button 114, an end button 116, a selection button 118, and four direction buttons 120, 122, 124, and 126. The keyboard tray 130 (sometimes referred to as the bottom portion or bottom body) includes a standard phone keypad 138, a USB port 132, a headphone jack 134, and a power receptacle 136. Two or more keyboards are incorporated into the keyboard tray. The keyboards do not just sit loosely on top of the keyboard tray, but are integrated into the keyboard tray. Both the main body 110 and the keyboard tray 130 include alcoves 140 set into their sides. Though included in FIG. 1, alcoves may be omitted from some embodiments of the present invention.

In one embodiment, the display 112 is an LCD display. In another embodiment, the display 112 is a touch screen display. The display 112 presents a user interface through which information is communicated to the user of the mobile communications device 100. The interface may allow the user to open various applications, such as an email client, a contact manager, a map application, a camera, a GPS application, games, and other applications. Input devices on the mobile communications device 100, may be used to navigate the user interfaces presented on the display 112. The talk button 114 may be used to initiate a call when a phone number is entered through a keypad. The end button 116 may terminate a call. Pushing the talk button 114 or the end button 116 and holding either button may turn the power to the mobile communications device 100 off and on. In one embodiment, a separate power button (not shown) is provided.

The selection button 118 may be used in conjunction with the navigation buttons 120, 122, 124, and 126 to select items on the display 112 and to navigate menus on the display 112. In one embodiment, the selection button 118 is a track ball that can rotate in two dimensions to move a cursor around the user interface presented on the display 112 and be pressed in the third dimension to make a selection. The right-navigation button 120 provides a right input to the mobile communications device 100 that may be used to move a pointer or cursor to the right. The down-navigation button 122 provides a down input to the mobile communications device 100 that may be used to move a pointer or cursor down. The left-navigation button 124 provides a left input to the mobile communications device 100 that may be used to move a pointer or cursor to the left. The up-navigation button 126 provides an up input to the mobile communications device 100 that may be used to move a pointer or cursor upward. Other buttons commonly found on a mobile communications device may be included on the main body 110 or the keyboard tray 130 of the mobile communications device 100.

The keyboard tray 130 slides out from beneath the main body 110 through an elongated channel (not shown in FIG. 1) included on the bottom of the main body 110. The elongated channel used in one embodiment of the present invention will be described subsequently with reference to FIGS. 8, 9, 10, 11, and 12. Other sliding mechanisms that allow the keyboard tray 130 to slide out from the under the main body 110 may be used. The keypad 138 is a standard phone keypad. Though not shown, the keys on the keypad 138 may also include one or more letters that may be associated with the individual numbers as is common on existing telephone keypads. The USB port 132 may be compatible with any universal serial bus ("USB"). Examples of suitable USB formats that may be utilized with USB port 132 include USB-A, USB-B, mini B, mini AB, micro A, and micro B.

The mobile communications device 100 includes many internal components to enable the mobile communications device 100 to make calls and perform other functions. The internal components are not shown for the sake of simplicity, but may include a radio interface, power supply, a processor, memory, bus, and other components to enable phone calls, video communications, camera functions, GPS functions, word processing, graphical display functions, text messaging, and emails. This list of functions is not meant to be exhaustive. The electronics within the mobile communications device 100 allow for the reception and transmission of data, including data formatted as IP packets. The mobile communications device 100 may make phone calls, send emails, receive videos, and surf the Internet. The mobile communications device 100 may be Blue Tooth enabled.

The various components in the mobile communications device 100 may be in either (or both) the main body 110 and the keyboard tray 130. The main body 110 and the keyboard tray 130 are communicatively coupled to one another through either a hard connection or a wireless connection. In order to establish a wireless connection, the main body 110 and keyboard tray 130 may both have a radio receiver and a radio transmitter. If the connection between the main body 110 and the keyboard tray 130 is only wireless then a power supply is required in the main body 110 and in the keyboard tray 130. The main body 110 and the keyboard tray 130 may be coupled by wires or other physical connections that allow communications and power to be passed between the two portions. USB ports, power inputs, headphone jacks, and other common components may be found in either the main body 110 or the keyboard tray 130.

Figure 2:
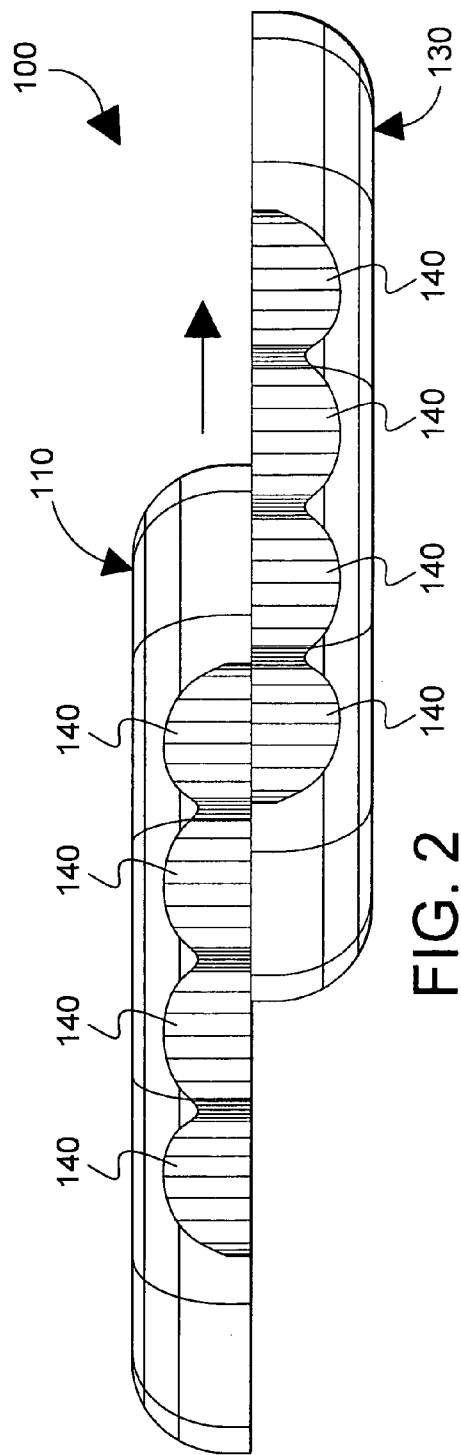
FIG. 2 is a diagram showing a side view of the mobile communications device in the open position, in accordance with an embodiment of the present invention.

Turning now to FIG. 2, a side view of the mobile communications device 100 in an open position is shown, in accordance with an embodiment of the present invention. FIG. 2 shows the mobile communications device 100 in the fully open position. The mobile communications device 100 is fully open when the pin (not shown) that connects the keyboard tray 130 that couples with the elongated channel (not shown) is at the far end (near the edge of the main body 110) of the elongated channel in the main body 110. As can be seen, both the main body 110 and the keyboard tray 130 are shaped like a semi-ellipsoid. The lower surface of the main body 110 and the upper surface of the keyboard tray 130 are both largely planer and are parallel to each other. The planer surfaces help the keyboard tray 130 slide relative to the main body 110. Though not shown, a slight space between the main body 110 and the keyboard tray 130 may be present. In order to facilitate movement between the two portions, the planer surfaces may be smooth. In one embodiment, a "smooth"

surface is any surface with friction coefficient of 0.5 or less. Embodiments of the present invention are not limited to the shape shown in FIG. 2 or other figures. Alcoves 140 are shown in the side of the main body 110 and the side of the keyboard tray 130. The main body 110 and the keyboard tray 130 slide relative to one another as indicated by the arrow. As indicated, FIG. 2 shows the mobile communications device 100 in its open position.

Figure 3:
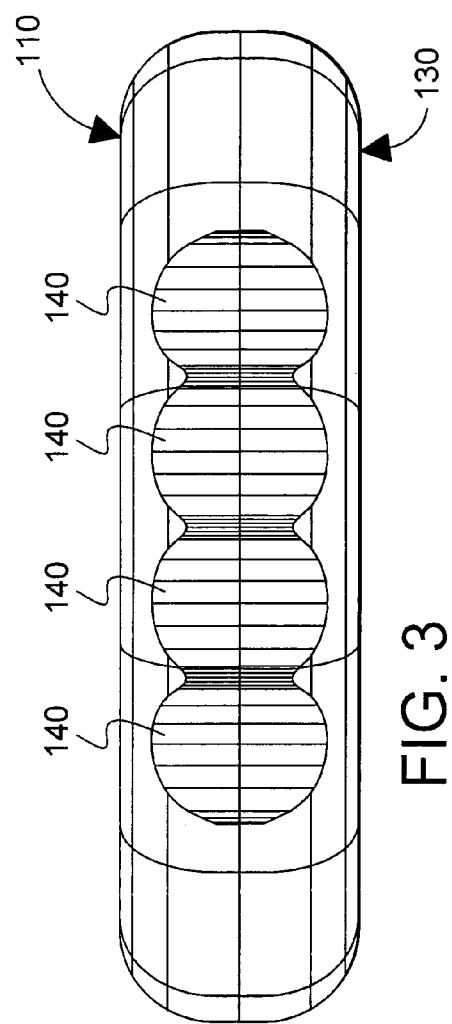
FIG. 3 is a diagram showing a side view of the mobile communications device in the closed position, in accordance with an embodiment of the present invention.

Turning now to FIG. 3, the mobile communications device 100 is shown in a closed position, in accordance with an embodiment of the present invention. The mobile communications device 100 is closed when the main body 110 is directly over the keyboard tray 130. As can be seen, the alcoves 140 on the main body 110 and the keyboard tray 130 match with each other when the mobile communications device 100 is in a closed position. In the closed position, the mobile communications device 100 forms an oblate spheroid. Ports, such as power ports or USB ports, are not shown in FIGS. 2 and 3 for the sake of simplicity.

Figure 4:
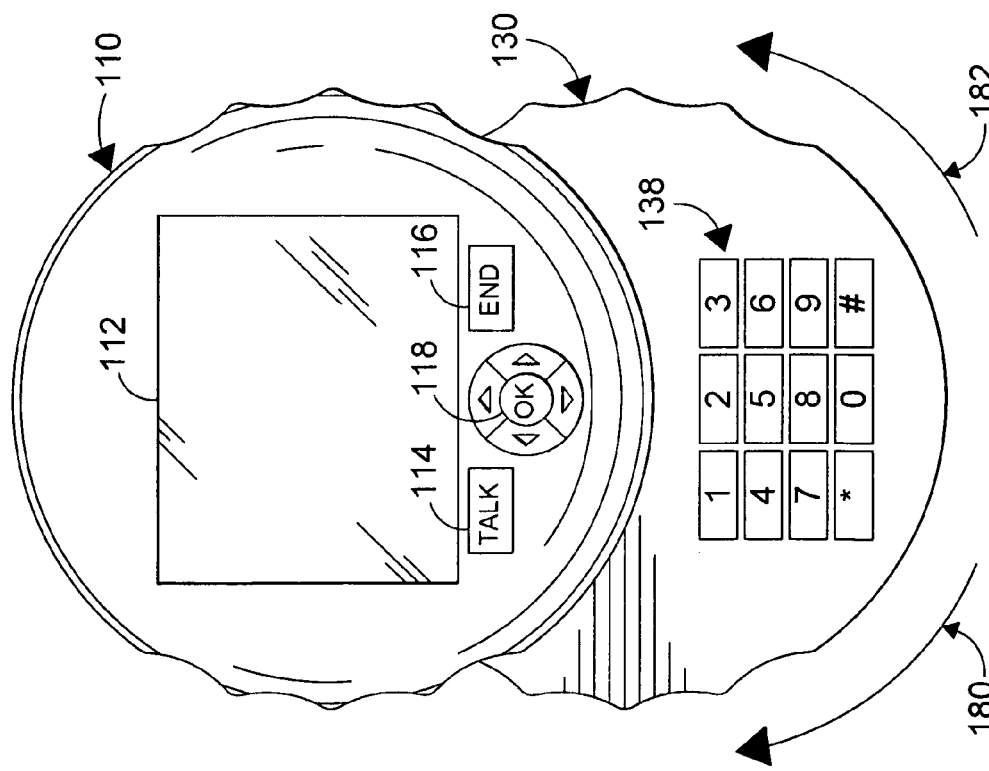
FIG. 4 is a diagram showing a top view of the mobile communications device in the open position with the keyboard tray in the home position, in accordance with an embodiment of the present invention.

Turning now to FIG. 4, a top view of the mobile communications device 100 in the open position with the keyboard tray 130 in the home position is shown, in accordance with an embodiment of the present invention. The components of the main body 110 and the keyboard tray 130 have been described previously with reference to FIG. 1. The first rotation arrow 180 indicates that the keyboard tray 130 may rotate in a counter-clockwise direction relative to the main body 110. The second rotation arrow 182 indicates that the keyboard tray 130 may rotate in a clockwise direction relative to the main body 110.

Figure 5:
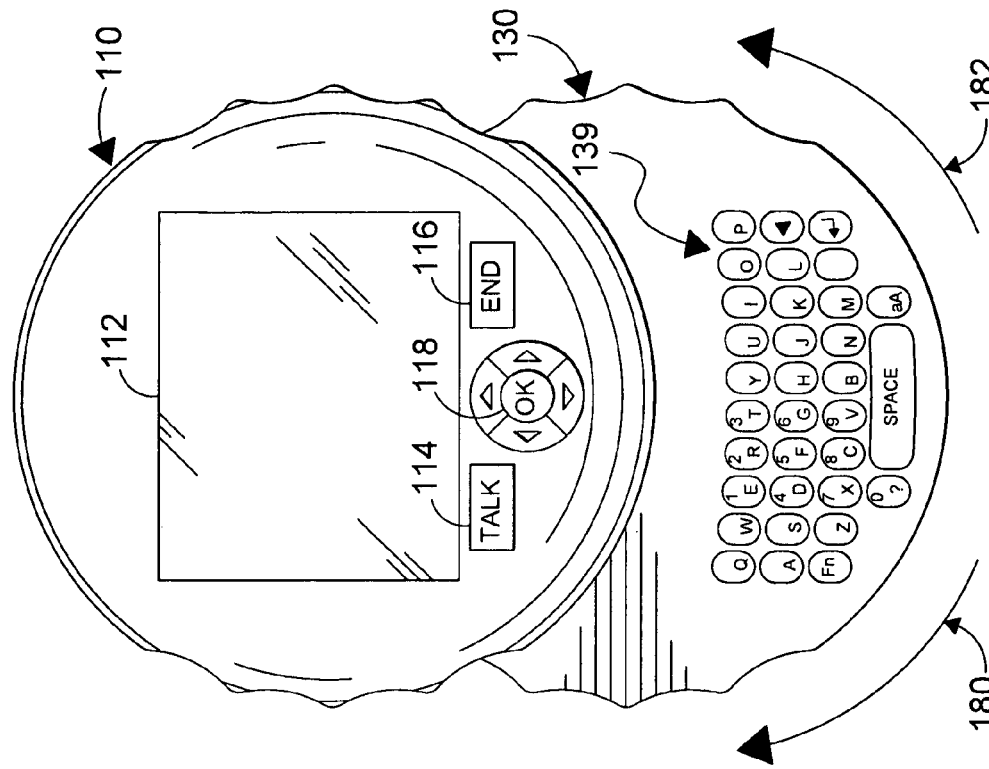
FIG. 5 is a diagram showing a top view of the mobile communications device in the open position with the keypad tray in the fully rotated position is shown, in accordance with an embodiment of the present invention.

Turning now to FIG. 5, a top view of the mobile communications device 100 in the open position with the keyboard tray 130 in the fully rotated position is shown, in accordance with an embodiment of the present invention. The components of the main body 110 and the keyboard tray 130 have been described previously with reference to FIG. 1. Upon rotating the keyboard tray 130 approximately 180° relative to the position of the keyboard tray 130 shown in FIG. 4, a QWERTY keypad 139 is revealed. The standard keypad 138 is now underneath the main body 110 and is not visible. In one embodiment, the keyboard tray 130 may be rotated more than 360 degrees relative to the main body 110.

Figure 6:
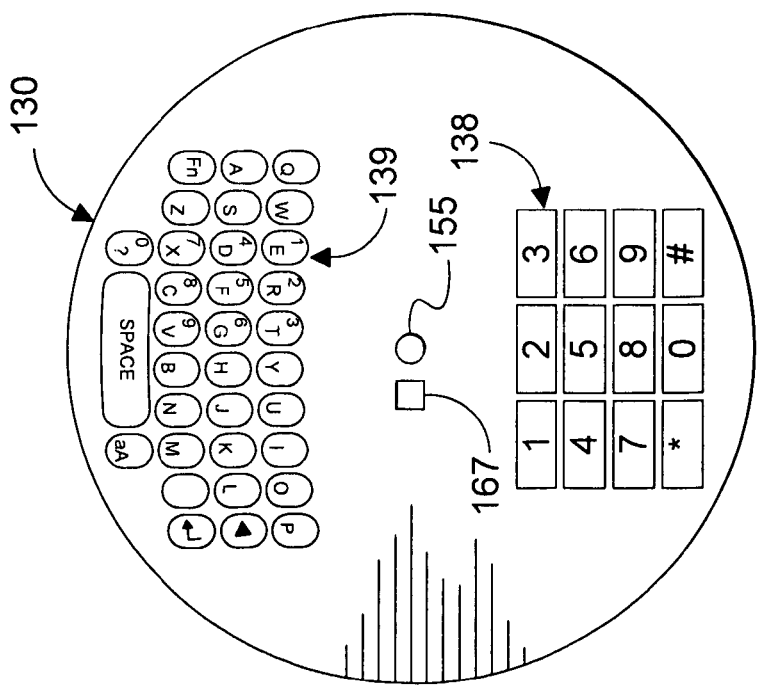
FIG. 6 is a diagram showing a top view of the keyboard tray having two keypads, in accordance with an embodiment of the present invention.

Turning now to FIG. 6, a top view of the keyboard tray 130 having two keypads is shown, in accordance with an embodiment of the present invention. The keyboard tray 130 is shown apart from the main body 110. As can be seen, the keyboard tray 130 includes a standard keypad 138 and a QWERTY keypad 139. The standard keypad 138 is not a QWERTY type keyboard. The QWERTY keypad 139 is oriented in the opposite direction of the standard keypad 138. Both the standard keypad 138 and the QWERTY keypad 139 are centered on a line running through the center of keyboard tray 130. The keyboard tray 130 rotates around pin 155. The pin 155 is located at the center of the keyboard tray 130. In other embodiments, the pin 155 may be off center. It may be desirable to move the pin 155 off center and closer to an oblong keypad to make room for a longer keypad. Wherein "long" is measured along the radius of the keyboard tray 130. The keyboard tray 130 may include a sensor 167. The sensor 167 may detect the orientation of the keyboard tray 130 and activate the exposed keypad. In addition to activating a keypad to receive or utilize input, other features, such as backlighting keys, may be activated or deactivated based on the position of the keyboard tray 130.

Figure 7:
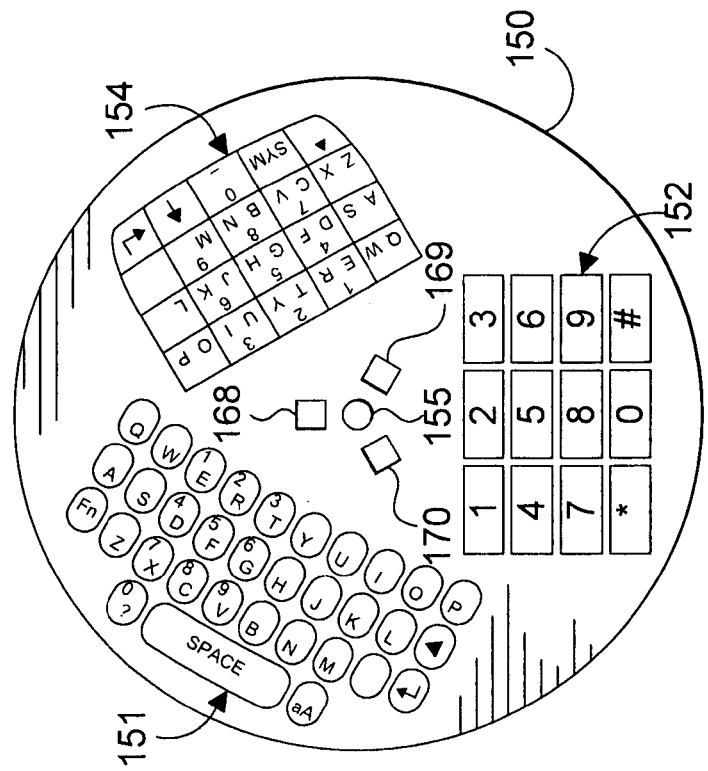
FIG. 7 is a diagram showing a top view of an alternative keyboard tray 130 having three keypads, in accordance with an embodiment of the present invention.

Turning now to FIG. 7, a top view of an alternative keyboard tray 150 having three keypads is shown, in accordance with an embodiment of the present invention. The alternative keyboard tray 150 includes three keypads. The three keypads shown include a QWERTY keypad 151, a standard keypad 152, and a modified QWERTY keypad 154. The three keypads may be activated in turn as the alternative keyboard tray 150 is rotated around pin 155. Again, pin 155 is shown in the center of the alternative keyboard tray 150, but in embodiments of the present invention, the pin 155 may be offset from the center. The alternative keyboard tray 150 includes three sensors: 168, 169, and 170. The three sensors 168, 169, and 170, may activate or deactivate the various keypads as they detect the position of the alternative keyboard tray 150. The sensors 168, 169, and 170 may interact with an indicator on the lower surface of the main body 110 to determine the orientation of the alternative keyboard tray 150. The use of sensors to determine the position of the alternative keyboard tray 150 may become more important when portions of unused keypads are exposed even when they are not in use, which is more likely when more than two keyboards are included in the alternative keyboard tray 150. Using the sensors, the unused keypads may be deactivated so that input accidentally received through the keypads is ignored by the mobile communications device 100.

Turning now to FIG. 8 a partial exploded section view of the main body 110 and the keyboard tray 130 is shown, in accordance with an embodiment of the present invention. The main body 110 defines an elongated channel 162 for receiving the pin 155. The elongated channel 162 is located in the center of the main body 110. The pin 155 protrudes from the top of the keyboard tray 130. The pin 155 is made of a support post 157 and a flange 156 that is connected to the top of the support post 157. In the profile view, the pin 155 is in the shape of a T. The section view of the elongated channel 162 includes a horizontal slot 164 that is slightly larger than the flange 156 and a vertical slot 163 that is slightly larger than the support post 157. The vertical slot 163 has an opening through the bottom of the main body 110. The main body 110 and the keyboard tray 130 are held together by the pin 155 coupling with the elongated channel 162. When in the elongated channel 162 the pin 155 is constrained such that it may only move in a single direction. Additional physical characteristics of the pin 155 and/or elongated channel 162 that are not described may be used to further restrain rotation of the pin 155, and the thus the keyboard tray 130, while in the elongated channel 162.

Turning now to FIG. 9, a partial section view of the mobile communication device 100 is shown, in accordance with an embodiment of the present invention. FIG. 9 is similar to FIG. 8, except that the main body 110 is shown coupled to the keyboard tray 130 rather than presented as an exploded view. When coupled together, the pin 155 is engaged in the elongated channel 162.

Turning now to FIG. 10, a section view of the mobile communications device 100 in the open position is shown, in accordance with an embodiment of the present invention. The section view shown in FIG. 10, is from the side in contrast to the section view shown previously with reference to FIG. 8. FIG. 10 includes the main body 110 and the keyboard tray 130. The elongated channel 162 includes a vertical slot 163 for the support post 157 and a horizontal slot 164 for the flange 156. The vertical slot 163 has an opening through the bottom of the main body 110. As can be seen, the horizontal slot 164 may be slightly longer than the vertical slot 163 to accommodate the additional length of the flange 156. As can be seen, the pin 155 and the keyboard tray 130 are at the far end of the elongated channel 162 when the mobile communications device 116 is fully open. The movement of the keyboard tray 130 relative to the main body 110 stops when the pin 155 reaches the end of the elongated channel 162. In one embodiment, the keyboard tray 130 may rotate relative to the main body 110 when the keyboard tray 130 is fully extended from the main body 110. The rotation may be facilitated by changes to elongated channel 162 at the end nearest the side of the main body 110.

Turning now to FIG. 11, a section view of the mobile communications device 100 in the closed position is shown, in accordance with an embodiment of the present invention. FIG. 11 is the same as FIG. 10, except that the mobile communication device is closed. In the closed position, the pin 155 slides to the end of the elongated channel 162 near the center of the main body 110.

Figure 12:
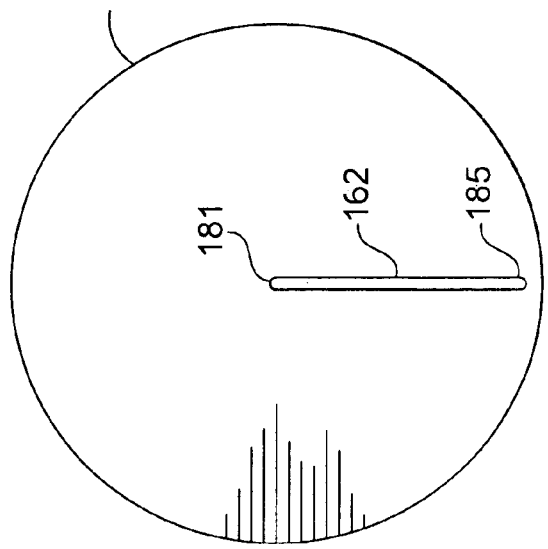
FIG. 12 is a diagram of the bottom surface of the main body, in accordance with an embodiment of the present invention.

Turning now to FIG. 12, a bottom view of the main body 110 is shown, in accordance with an embodiment of the present invention. The main body 110 defines the elongated channel 162. The opening through the bottom of the main body 110 leading into the elongated channel 162 is the only part of the elongated channel 162 that can be seen in FIG. 12. Elongated channel 162 allows the pin 155 (not shown in FIG. 12) in the keyboard tray 130 to slide from center point 181 to the opposite end 185 of the elongated channel 162. The main body 110 may include sensors (not shown) to determine the orientation of the keyboard tray 130 relative to the main body 110. As explained previously, the relative orientation of the main body 110 and keyboard tray 130 may be used to activate and deactivate various keypads.

Figure 13:
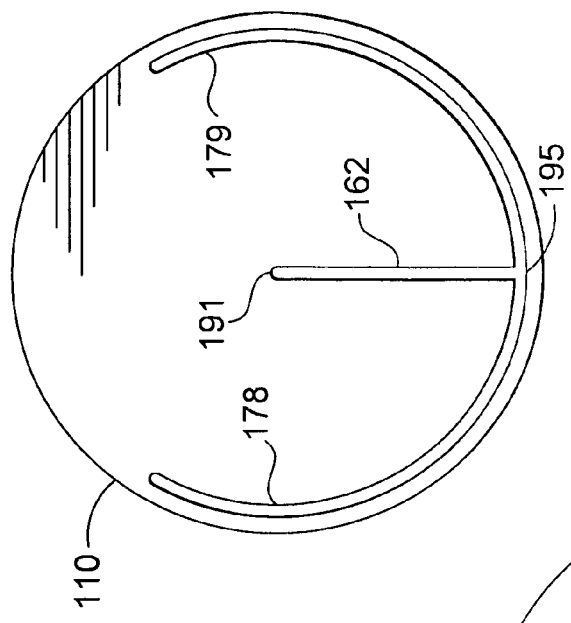
FIG. 13 is a diagram of the bottom surface of the main body including arc channels, in accordance with an embodiment of the present invention.

Turning now to FIG. 13, a bottom view of the main body 110 is shown, in accordance with an embodiment of the present invention. The opening from the elongated channel 162, which passes through the bottom of the main body 110 is shown. As can be seen, the pin 155 (not shown in FIG. 13) may slide from center point 191 to the opposite end 195 of the elongated channel 162. In one embodiment, once the pin 155 reaches the opposite end 195 of the elongated channel 162 the pin 155 may move into either arc channel 178 or arc channel 179. Arc channels 178 and 179 both have a size and shape similar to elongated channel 162. Both arc channel 178 and arc channel 179 allow the pin 155 to move through the length of the channels.

Figure 14:
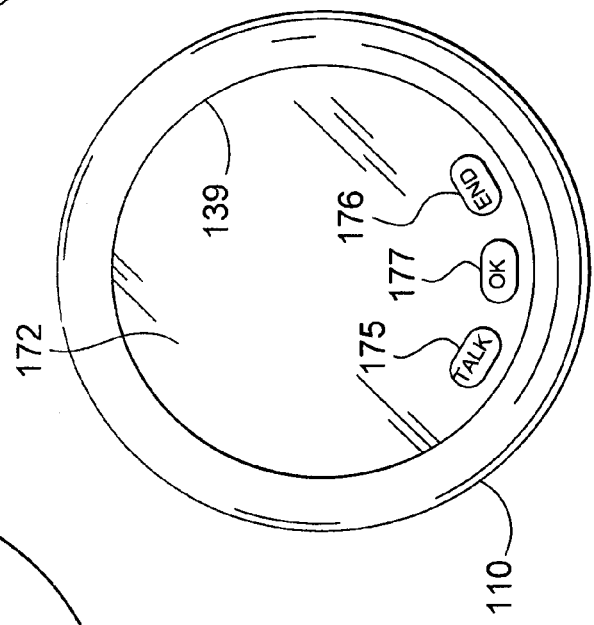
FIG. 14 is a diagram of the top surface of the main body having an incorporated touch screen display.

Turning now to FIG. 14, a top view of main body 110 is shown, in accordance with an embodiment of the present invention. The main body 110 includes a single touch screen display 172. A soft talk button 175 and a soft end button 176 are shown on the touch screen display 172. The soft talk button 175 may be used to initiate a telephone call and the soft end button 176 may be used to terminate a telephone call. The soft selection button 177 may be used to make a selection of an item displayed on the touch screen. In another embodiment, items shown on a touch screen are simply selected by touching the item. Because of the variety of different display options on touch screen display 172 the other selectable portions of the screen are not displayed for the sake of simplicity. For example, various applications may be displayed and selected by touching the touch screen display 172 at the point where the application icon is displayed.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A mobile communications device comprising:
a main body having a top body surface that is opposite a bottom body surface, the main body defining an elongated channel having an opening through the bottom body surface, wherein the main body has a circular shape, and wherein the main body includes a first radio receiver and a first radio transmitter;
a display screen incorporated into the top body surface;
a keyboard tray physically connected to and electrically connected with the main body, wherein the keyboard tray has a top tray surface that is opposite a bottom tray surface, and wherein keyboard tray has a circular shape, and wherein the keyboard tray includes a second radio receiver and a second radio transmitter that communicatively couple the main body and the keyboard tray to each other through a wireless connection;
a pin protruding from the top tray surface and engaged with the elongated channel in the bottom body surface, thereby connecting the keyboard tray to the main body such that the keyboard tray may slide from a first position at an end of the elongated channel near a center of the main body to a second position at an opposite end of the elongated channel near an edge of the main body, wherein the pin also allows the keyboard tray to rotate relative to the main body;
a first keyboard incorporated into a first section of the top tray surface, wherein the first keyboard has a first orientation, and wherein the first keyboard includes a first plurality of keys; and
a second keyboard incorporated into a second section of the top tray surface, wherein the second keyboard has a second orientation that is different than the first orientation, wherein the second keyboard includes a second plurality of keys some of which keys are different than keys in the first plurality of keys, and wherein the first section and the second section are on different sides of the pin;
a sensor connected to one or more of the main body and the keyboard tray for detecting a current degree of rotation for the keyboard tray relative to the main body; and
a keyboard controller coupled to the sensor and the top tray that activates and deactivates the first keyboard and the second keyboard based on the current degree of rotation for the keyboard tray relative to the main body.

2. The mobile communications device of claim 1, wherein the display screen is a touch-screen display.

3. The mobile communications device of claim 2, wherein the display screen has a circular shape.

4. The mobile communications device of claim 1, wherein the first keyboard is a QWERTY keyboard and the second keyboard is not a QWERTY keyboard.

5. The mobile communications device of claim 1, wherein the main body and the keyboard tray form an oblate spheroid when the main body is directly over the keyboard tray.

6. A circular-shaped mobile communications device having a main body that slides and rotates relative to a keyboard tray comprising:
the main body having a top body surface that is opposite a bottom body surface, the main body defining an elongated channel having an opening through the bottom body surface, wherein the main body has a circular shape, wherein the main body includes a first radio receiver and a first radio transmitter, and wherein opposite side walls of the main body each define multiple alcoves;

the keyboard tray connected to the main body, such that the keyboard tray may slide and rotate relative to the main body, wherein the keyboard tray has a top tray surface that is opposite a bottom tray surface, wherein the keyboard tray has a circular shape, and wherein the keyboard tray includes a second radio receiver and a second radio transmitter that communicatively couples the main body to the keyboard tray through a wireless connection formed with the first radio and the first receiver;

a first keyboard incorporated into a first section of the top tray surface, wherein the first keyboard is a QWERTY keyboard and has a first orientation;

a second keyboard incorporated into a second section of the top tray surface, wherein the second keyboard has a second orientation that is different than the first orientation, wherein the second keyboard is a standard phone keypad; and a third keyboard incorporated into a third section of the top tray surface, wherein the third keyboard has a third orientation that is different than the first orientation and the second orientation, wherein the second keyboard is a modified QWERTY keypad, wherein a center point of the first section, a center point of the second section, and a center point of the third section are evenly spaced around a center of the keyboard tray;

a sensor connected to one or more of the main body and the keyboard tray for detecting a current degree of rotation for the keyboard tray relative to the main body; and a keyboard controller coupled to the sensor and the top tray that activates and deactivates the first keyboard, the second keyboard, and the third keyboard based on the current degree of rotation for the keyboard tray relative to the main body.

7. The circular-shaped mobile communications device of claim 6, wherein the main body and the keyboard tray form an oblate spheroid when the keyboard tray is directly underneath the main body.

8. A mobile communications device with a perimeter shaped as an oblate spheroid when the mobile communications device is in a closed position comprising:

a main body shaped as a semi-oblate spheroid, wherein the main body includes a first radio receiver and a first radio transmitter;

a keyboard tray shaped as a semi-oblate spheroid that is physically connected to the main body such that the keyboard tray may rotate at least 360 degrees relative to the main body, wherein the mobile communications device is in a closed position when the main body is directly on top of the keyboard tray, and wherein the keyboard tray includes a second radio receiver and a second radio transmitter that communicatively couple the main body and the keyboard tray to each other through a wireless connection;

a first keyboard incorporated into a first section of a top surface of the keyboard tray, wherein the first keyboard has a first orientation;

a second keyboard incorporated into a second section of the top surface, wherein the second keyboard has a second orientation that is different than the first orientation, wherein the first section and the second section are on different sides of the top surface, and wherein a center point of the first section and a center point of the second section are evenly spaced from a center of the keyboard tray;

a sensor connected to one or more of the main body and the keyboard tray for detecting a current degree of rotation for the keyboard tray relative to the main body; and a keyboard controller coupled to the sensor and the top tray that activates and deactivates the first keyboard and the second keyboard based on the current degree of rotation for the keyboard tray relative to the main body.

9. The mobile communications device of claim 8, further comprising a touch-screen display incorporated into the top surface of the main body.

10. The mobile communications device of claim 9, wherein an engagement of a pin protruding from the keyboard tray in the channel allows the keyboard tray to slide relative to the main body.

11. The mobile communications device of claim 8, further comprising a circular touch-screen display incorporated into a top side of the main body.

* * * * *